(12) United States Patent
Hagi et al.

(10) Patent No.: US 11,235,718 B2
(45) Date of Patent: Feb. 1, 2022

(54) POWER SOURCE SYSTEM (71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Masahiro Hagi, Yokkaichi (JP); Akio Ishihara, Yokkaichi (JP); Tomohiro Taniguchi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/254,524

(22) PCT Filed: May 21, 2019

(86) PCT No.: PCT/JP2019/020015
§ 371 (c)(1),
(2) Date: Dec. 21, 2020

(87) PCT Pub. No.: WO2020/008742
PCT Pub. Date: Jan. 9, 2020

(65) Prior Publication Data
US 2021/0268975 A1   Sep. 2, 2021

(30) Foreign Application Priority Data
Jul. 5, 2018 (JP) .............................. JP2018-128096

(51) Int. Cl.
*B60R 16/033* (2006.01)
*H01M 50/298* (2021.01)
*B60L 50/61* (2019.01)

(52) U.S. Cl.
CPC ............ *B60R 16/033* (2013.01); *B60L 50/61* (2019.02); *H01M 50/298* (2021.01); *B60L 2210/42* (2013.01); *H01M 2220/20* (2013.01)

(58) Field of Classification Search
None
See application file for complete search history.

(56) References Cited

U.S. PATENT DOCUMENTS 5,504,655 A    4/1996  Underwood et al.
10,122,125 B2  11/2018 Maki et al.
(Continued)

FOREIGN PATENT DOCUMENTS

JP    2010-36594 A    2/2010

OTHER PUBLICATIONS

Jul. 30, 2019 Search Report issued in International Patent Application No. PCT/JP2019/020015.

*Primary Examiner* — Jared Fureman
*Assistant Examiner* — Aqeel H Bukhari
(74) *Attorney, Agent, or Firm* — Oliff PLC (57) ABSTRACT

A vehicle including: a battery box inside of which a plurality of battery cells are provided, auxiliary equipment that can operate using electrical power, a travel system that can travel using electrical power, and a branch box that electrically connects the battery cells and the auxiliary equipment, and that electrically connects the battery cells and the travel system.

2 Claims, 6 Drawing Sheets

(56) References Cited

U.S. PATENT DOCUMENTS

| | | |
|---|---|---|
| 10,741,979 B2 | 8/2020 | Maki et al. |
| 2015/0171632 A1* | 6/2015 | Fry .................... H02J 7/00036 |
| | | 307/22 |
| 2017/0229894 A1* | 8/2017 | Durando ............... H01M 50/20 |
| 2017/0292982 A1 | 10/2017 | Acena et al. |
| 2018/0269703 A1* | 9/2018 | Nook .................. H01M 50/543 |

* cited by examiner

POWER SOURCE SYSTEM

BACKGROUND

The technique disclosed by the present specification relates to a power source system.

An electrical device connection system for a vehicle according to JP 2016-13754A below has been known as an example of a conventional power source system. The electrical device connection system for a vehicle includes a standard-type power source distribution box that distributes power source electrical power from a main power source in a vehicle and supplies electrical power to each of multiple power source wires of a standard-type sub-harness of a wire harness, and an expanded-type power source distribution box that distributes power source electrical power from a main power source in a vehicle and supplies electrical power to each of multiple core wires of an expanded-type sub-harness of the wire harness.

SUMMARY

If the above-described electrical device connection system is applied to electric automobiles of different vehicle grades, due to the fact that the voltage generally tends to be higher in a high-end car than in a general car, the sizes of the standard-type power source distribution box and the expanded-type power source distribution box are also greater compared to those of a general car, and thus it is necessary to prepare a standard-type power source distribution box and an expanded-type power source distribution box that are different from those of a general car.

A vehicle according to an exemplary aspect includes a battery box inside of which a plurality of battery cells are provided, auxiliary equipment that can operate using electrical power, a travel system that can travel using electrical power, and a branch box that electrically connects the battery cells and the auxiliary equipment, and the battery cells and the travel system. The branch box includes a first branch box and a second branch box, the first branch box includes a first connection that is electrically connected to the travel system and can receive input of electrical power from the travel system or output electrical power to the travel system, and a first branch circuit that electrically connects the battery cells and the first connection. The second branch box includes a second connection that is electrically connected to the auxiliary equipment and can receive input of electrical power from the auxiliary equipment or output electrical power to the auxiliary equipment, and a second branch circuit that electrically connects the battery cells and the second connection.

By dividing the branch box into two, namely the first branch box and the second branch box, and furthermore providing the fourth connection that is connected to the travel system on the first branch box and providing the third connection that is connected to the auxiliary equipment on the second branch box, the first branch box can be categorized in a travel system, and the second branch box can be categorized in an equipment system. Here, in general, the higher the voltage input to the branch box is, the greater the size of the bus bars or the connections, and accordingly, the greater the shape of the branch box also is. At this time, due to the fact that the voltage used in the travel system tends to be high (e.g., about 1000 V maximum) in a high-grade car (high-end car) and tends to be low (e.g., about 500 V maximum) in a low-grade car (general car), the size of the first branch box is greater in a high-end car. On the other hand, the voltage used in the equipment system is the same voltage (e.g., about 500 V maximum) in both a high-end car and a general car, and the size of the second branch box is the same in both a high-end car and a general car. Accordingly, the second branch box can be used in common in different vehicle grades (high-end cars and general cars) and the number of parts can be reduced.

The branch box may also have a configuration in which the branch box is provided outside of the battery box, the battery box includes a third connection that is electrically connected to the plurality of battery cells and can receive input of electrical power for charging the plurality of battery cells and output electrical power from the plurality of battery cells, the first branch box includes a fourth connection that is electrically connected to the third connection and the first branch circuit, and a coupling circuit that electrically connects the first branch circuit and the second branch circuit is provided between the first branch circuit and the second branch circuit.

Since the branch circuit is provided in a branch box provided outside of a battery box, compared to a configuration in which the branch circuit is provided inside of a battery box as in the conventional technique, it is possible to reduce the number of connections connecting the battery box and the functional parts (e.g., the auxiliary equipment, the travel system, etc.) mounted outside of the battery box, and the battery box can be reduced in size. Also, due to the coupling circuit that couples the first branch circuit and the second branch circuit being provided, there is no need for a connection that connects from the battery box to the second branch box, and thus the number of connections for connecting the battery box and an external functional part (e.g., the auxiliary equipment, the travel system, etc.) can be further reduced. Also, when an electronic part such as a fuse in the branch box breaks down, only the branch box can be removed from the vehicle and a task of exchanging the electronic part can be performed. This makes it possible to improve maintainability due to the fact that it is not necessary to remove the battery box from the vehicle in order to exchange an electronic part such as a fuse, as in the conventional technique.

Also, the travel system may also have a configuration in which the travel system includes an electric motor for causing the vehicle to travel and a power control unit that includes an inverter for causing the electric motor to operate, a voltage by which the inverter can operate is a first voltage, which is a voltage of the third connection of the battery box, and a voltage of the first connection and the fourth connection has the same potential as the first voltage, a voltage of the second connection is a second voltage that is different from the first voltage, the coupling circuit includes a first coupling circuit that is electrically connected to the first branch circuit and a second coupling circuit that is electrically connected to the second branch circuit, and the first coupling circuit and the second coupling circuit are electrically connected to each other via a transformation apparatus for transforming the first voltage to the second voltage.

The first voltage of the third connection of the battery box has the same potential as the operation voltage of the inverter, and therefore there is no need for a boost converter that converts the input voltage to the operation voltage of the inverter in the power control unit, and the power control unit can be reduced in size.

According to the power source system disclosed in the present specification, the number of parts can be reduced by dividing the branch box into a first branch box for a travel system and a second branch box for an equipment system, and using the second branch box in common for different vehicle grades.

DETAILED DESCRIPTION OF EMBODIMENTS

First Embodiment

Figure 1:
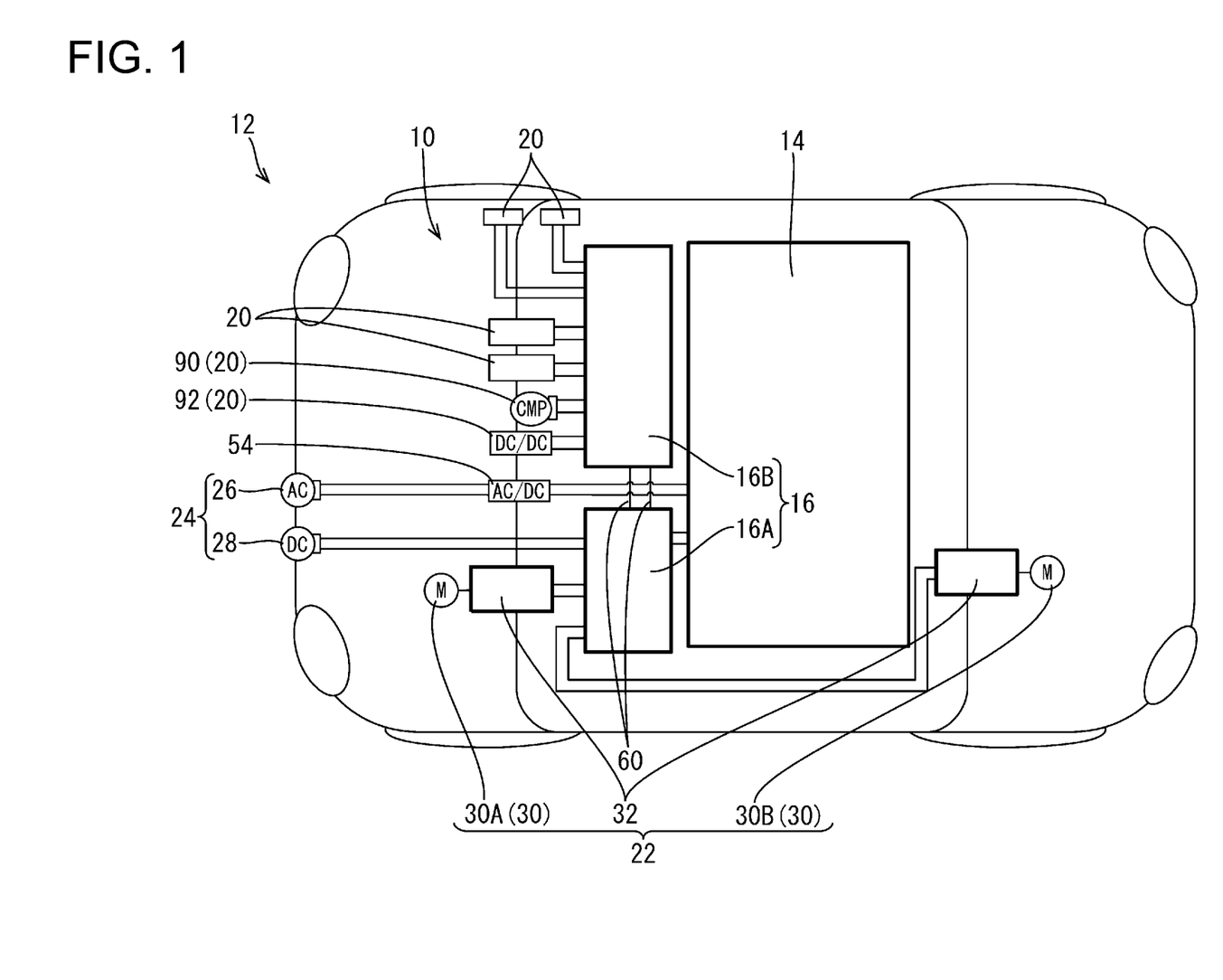
FIG. 1 is a schematic view showing a state in which a power source system according to a first embodiment is applied to a vehicle.
Figure 2:
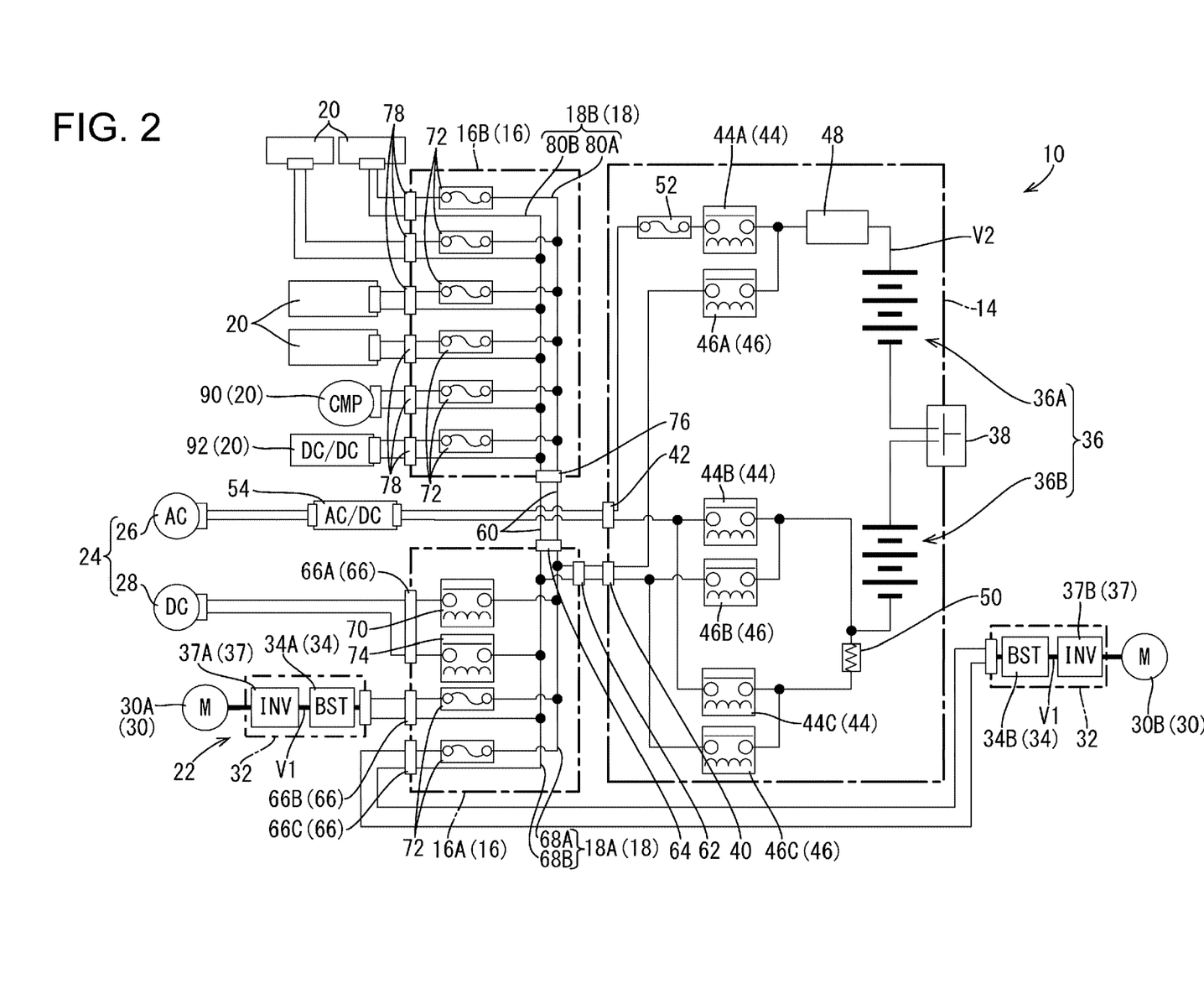
FIG. 2 is a block diagram showing an electrical configuration of the power source system according to the first embodiment.

The present embodiment will be described with reference to FIGS. 1 to 5. As shown in FIG. 1, a power source system 10 according to the present embodiment is mounted in a vehicle 12, and as shown in FIG. 2, is a system that supplies power to be supplied from the battery box 14 to auxiliary equipment 20 and a travel system 22 via a branch circuit 18 of a branch box 16 provided outside of the battery box 14.

The vehicle 12 is provided with a power supply unit 24 that supplies power from the outside, and the power supply unit 24 is constituted by an AC (Alternating Current) power supply unit 26 that performs power supply from an AC power source for home use, and a DC (Direct Current) power supply unit 28 that performs power supply from a rapid charging facility (not shown). Electrical power of 500 V and 400 A (150 kW) is supplied from the DC power supply unit 28.

The travel system 22 includes a motor (electric motor) 30 that drives wheels, and PCUs (Power Control Units) 32 that control the motor 30. The PCUs 32 include boost converters 34 that boost an input DC voltage to a DC voltage V1 that is higher than the input DC voltage, and inverters 37 that convert the boosted DC voltage into an AC voltage of a predetermined frequency, and the AC voltages output from the inverters 37 are input to the motor 30. The rotation speed of the motor 30 depends on the frequency of the AC voltage, and the motors 30 can be controlled by controlling the frequency of the AC voltage.

The motor 30 is constituted by an FR (front)-side (the left side in FIGS. 1 and 2) motor 30A and an RR (rear)-side (the right side in FIGS. 1 and 2) motor 30B. Also, the boost converter 34 is constituted by an FR-side boost converter 34A and an RR-side boost converter 34B. Also, the inverter 37 is constituted by an FR-side inverter 37A and an RR-side inverter 37B. Note that in FIG. 2, the PCU 32 is depicted divided into an FR side and an RR side for the sake of convenience, but it is assumed that the PCU 32 is an integral unit.

Multiple battery cells connected in series (hereinafter referred to as "battery cell group 36") are provided inside of the battery box 14. The battery cell group 36 is constituted by a first battery cell group 36A and a second battery cell group 36B, and the first battery cell group 36A and the second battery cell group 36B are connected in series via a service plug 38. The service plug 38 can be taken out and inserted from the outside, and electrical conduction between the first battery cell group 36A and the second battery cell group 36B can be shut off by taking out the service plug 38 during maintenance.

The battery box 14 is provided with a first connector (third connection portion) 40 and a second connector 42 that are connected to an external device. Power-source-side positive terminals and GND (ground)-side negative terminals are included in the first connector 40 and the second connector 42. Note that it is assumed that positive terminals and negative terminals are similarly included also in connectors other than the first connector 40 and the second connector 42 in the present embodiment (a later-described third connector (fourth connection portion) 62, a fourth connector 64, a fifth connector (first connection portion) 66, a sixth connector 76, and a seventh connector (second connection portion) 78).

The battery cell group 36 has a rated voltage of 350 V and a maximum voltage of 500 V. In the present embodiment, the DC voltage V2 output from the battery cell group 36 in the state in which a load is connected has a rated voltage of 350 V.

An ACR (Alternating Current Relay) 44, which is a relay that is used during charging from an AC power source for home use, and an SMR (System Main Relay) 46, which is a system main relay, are provided inside of the battery box 14. The ACR 44 and the SMR 46 are switched to one of an ON (conducting) state and an OFF (open) state due to a control signal from a control unit (not shown).

The ACR 44 is constituted by a first ACR 44A, a second ACR 44B, and a third ACR 44C, which is a relay for pre-charging, and the SMR 46 is constituted by a first SMR 46A, a second SMR 46B, and a third SMR 46C, which is a relay for pre-charging.

The upstream sides of the first ACR 44A and the first SMR 46A are electrically connected to the downstream side of a current sensor 48 that detects current, and furthermore, the upstream side of the current sensor 48 is electrically connected to the positive side of the first battery cell group 36A. Also, the upstream sides of the second ACR 44B and the second SMR 46B are electrically connected to the negative side of the second battery cell group 36B.

The upstream sides of the third ACR 44C and the third SMR 46C are electrically connected to the downstream side of a current restriction resistor 50 that restricts current during pre-charging, and furthermore, the upstream side of the current restriction resistor 50 is electrically connected to a negative side of the second battery cell group 36B.

The downstream side of the first SMR 46A is electrically connected to the positive terminal of the first connector 40 and the downstream side of the second SMR 46B is electrically connected to the negative terminal of the first connector 40.

The downstream side of the first ACR 44A is connected to the upstream side of an AC fuse 52 for overcurrent protection during AC charging, and furthermore, the downstream side of the AC fuse 52 is electrically connected to the positive terminal of the second connector 42. The downstream sides of the second ACR 44B and the third ACR 44C are electrically connected to the negative terminal of the second connector 42.

The second connector 42 is connected to the AC power supply unit 26 via an AC/DC converter 54 that is provided outside of the battery box 14. The AC/DC converter 54 converts the AC voltage input from the AC power supply unit 26 into a DC voltage. The DC voltage resulting from the conversion performed by the AC/DC converter 54 is applied to the battery cell group 36, and the battery cell group 36 is charged. At this time, first, pre-charging is performed in a state in which the first ACR 44A and the third ACR 44C are on and the second ACR 44B is off. Next, if the current detected by the current sensor 48 is a certain value or less, AC charging control is performed in which the second ACR 44B is switched from off to on, the third ACR 44C is switched from on to off, and charging is started.

The branch circuit 18 is constituted by a first branch circuit 18A, a second branch circuit 18B, and a coupling circuit 60 that electrically connects the first branch circuit 18A and the second branch circuit 18B.

The branch box 16 is constituted by a first branch box 16A that branches and outputs the electrical power input from the battery box 14 to the travel system 22 and the DC power supply unit 28 (travel/charging system) and a second branch box 16B that branches and outputs the electrical power input from the first branch box 16A to the multiple pieces of auxiliary equipment 20 (equipment system). In this manner, since the branch circuit 18 is provided inside of the branch box 16 provided outside of the battery box 14, compared to a configuration in which the branch circuit is provided inside of the battery box as in the conventional technique, the number of connection portions connecting the battery box 14 and external functional parts (e.g., the auxiliary equipment 20, the travel system 22, etc.) can be reduced, and the battery box 14 can be made smaller in size.

A third connector 62 that is electrically connected to the first connector 40, a fourth connector 64 that is electrically connected to a later-described sixth connector 76 of the second branch box 16B, and three fifth connectors 66 that are electrically connected to the PCUs 32 of the travel system 22 and the DC power supply unit 28 are provided in the first branch box 16A.

The first branch circuit 18A is provided in the first branch box 16A, and is constituted by a positive-side first bus bar 68A that electrically connects the positive terminals of the connectors (the third connector 62, the fourth connector 64, and the fifth connector 66) of the first branch box 16A, and a negative-side first bus bar 68B that electrically connects the negative terminals.

The fifth connector 66 is constituted by a fifth connector 66A that is electrically connected to the DC power supply unit 28, a fifth connector 66B that is electrically connected to the FR-side boost converter 34A of the PCU 32, and a fifth connector 66C that is electrically connected to the RR-side boost converter 34B of the PCU 32.

A first DC charging relay 70 and two fuses 72 are attached to the positive-side first bus bar 68A, and a second DC charging relay 74 is attached to the negative-side first bus bar 68B. The positive terminal of the third connector 62 and the positive terminal of the fifth connector 66A are electrically connected to each other via the first DC charging relay 70, and the negative terminal of the third connector 62 and the negative terminal of the fifth connector 66A are electrically connected to each other via the second DC charging relay 74. Also, the positive terminal of the third connector 62 and the positive terminal of the fifth connector 66B are electrically connected to each other via a fuse 72, and the positive terminal of the third connector 62 and the positive terminal of the fifth connector 66C are electrically connected to each other via a fuse 72. When the fuses 72 are disconnected, the first branch box 16A can be taken out of the vehicle 12 and a task for exchanging the fuses 72 can be performed. For this reason, maintainability is improved compared to a configuration in which the fuses 72 are provided in the battery box and the entire battery box is taken out of the vehicle and exchanged when the fuses 72 are disconnected, as in the conventional technique.

The first DC charging relay 70 and the second DC charging relay 74 are switched to one of an on (conducting) state and an off (open) state due to a control signal from a control unit (not shown). When power supply is performed from the DC power supply unit 28, pre-charging is performed in a state in which the first DC charging relay 70, the second DC charging relay 74, the first SMR 46A, and the third SMR 46C are on and the second SMR 46B is off. Next, when the current detected by the current sensor 48 is less than or equal to a certain value, DC charging control is performed in which the second SMR 46B is switched from off to on, the third SMR 46C is switched from on to off, and charging is started.

The sixth connector 76 that is electrically connected to the fourth connector 64 of the first branch box 16A and six (same as the number of pieces of auxiliary equipment 20) seventh connectors 78 that are electrically connected to the auxiliary equipment 20 are provided in the second branch box 16B.

The second branch circuit 18B is provided in the second branch box 16B, and is constituted by a positive-side second bus bar 80A that electrically connects the positive terminals of the connectors (the sixth connector 76 and the seventh connectors 78) of the second branch box 16B to each other, and a negative-side second bus bar 80B that electrically connects the negative terminals to each other.

A number (six) of fuses 72 that is the same as the number of seventh connectors 78 are attached to the positive-side second bus bar 80A, and the positive terminal of the sixth connector 76 and the positive terminals of the six seventh connectors 78 are electrically connected to each other via the fuses 72.

The coupling circuit 60 electrically connects the positive terminal of the fourth connector 64 and the positive terminal of the sixth connector 76 to each other, and electrically connects the negative terminal of the fourth connector 64 and the negative terminal of the sixth connector 76 to each other. Accordingly, the positive-side first bus bar 68A and the positive-side second bus bar 80A are electrically connected to each other, and the negative-side first bus bar 68B and the negative-side second bus bar 80B are electrically connected to each other. Due to providing this kind of coupling circuit 60, there is no need for a connection portion for connecting from the battery box 14 to the second branch box 16B, and the number of connection portions for connecting the battery box 14 and the external functional part to each other can be further reduced.

Figure 3:
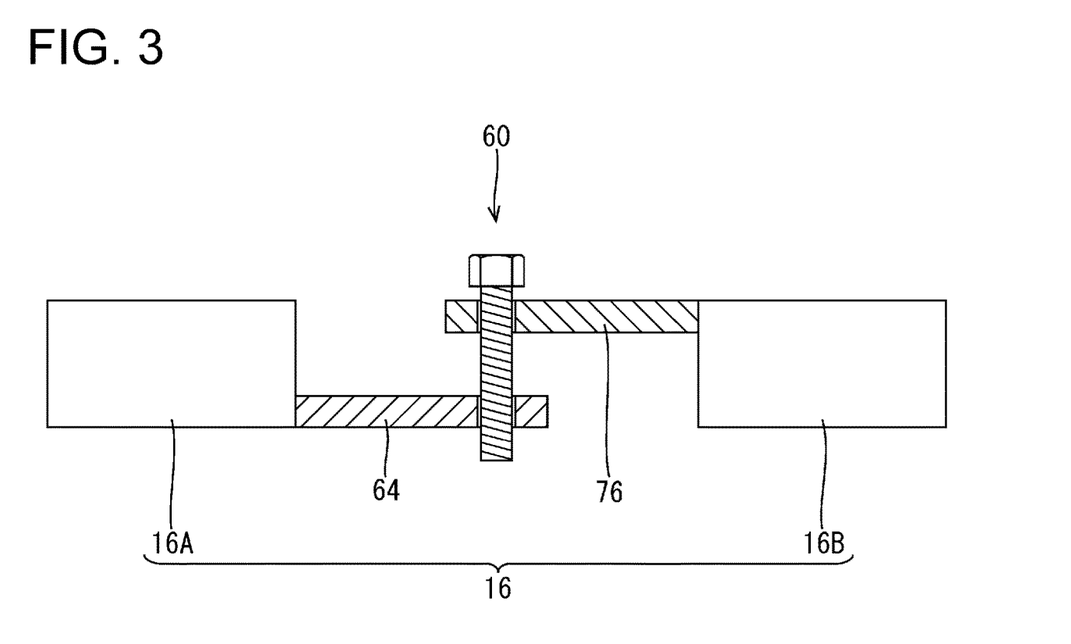
FIG. 3 is a diagram showing a connection structure connecting a first branch box and a second branch box in bolt fastening.

As one example of the coupling circuit 60, for example, it is also possible to use a configuration in which the fourth connector 64 and the sixth connector 76 are electrically connected to each other through bolt fastening as shown in FIG. 3.

Figure 4:
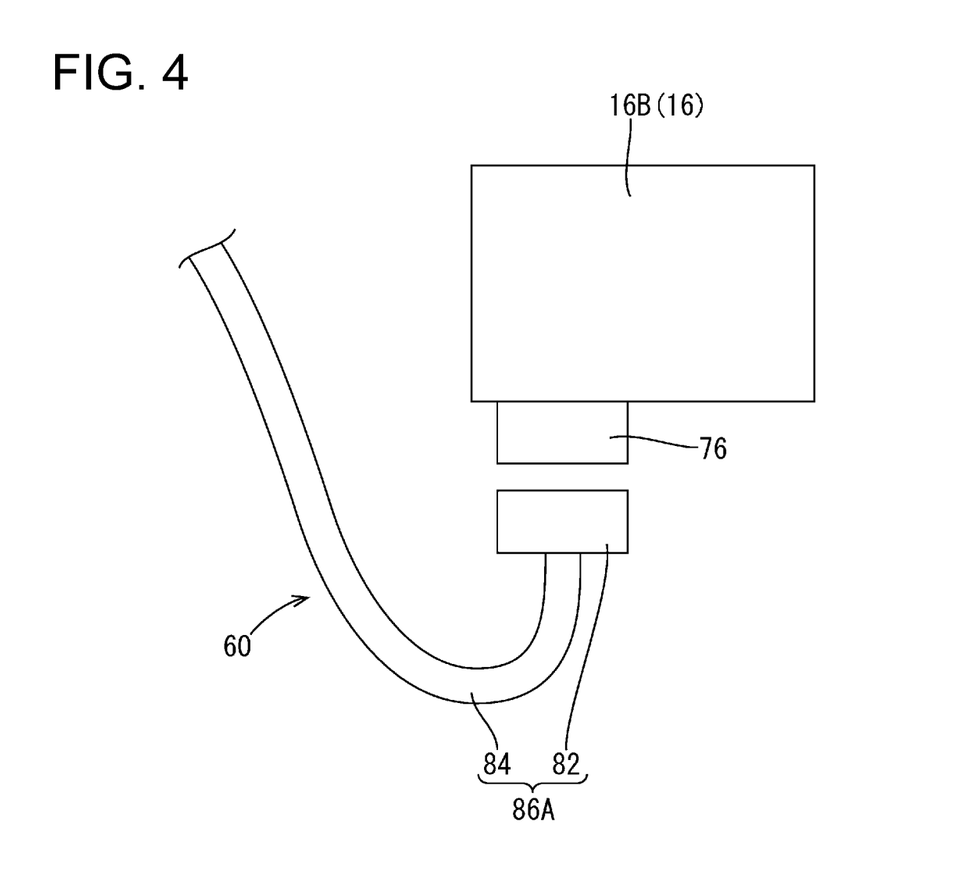
FIG. 4 is a diagram showing a connection structure of the first branch box and the second branch box achieved by a connector.

As shown in FIG. 4, it is also possible to use a configuration in which the fourth connector 64 and the sixth connector 76 are electrically connected to each other by a harness 86A constituted by a connector 82 and an electrical wire group 84. Note that in FIG. 4, the fourth connector 64 and a harness-side connector that is connected to the fourth connector 64 are not shown, but have a configuration similar to that on the sixth connector 76 side.

Figure 5:
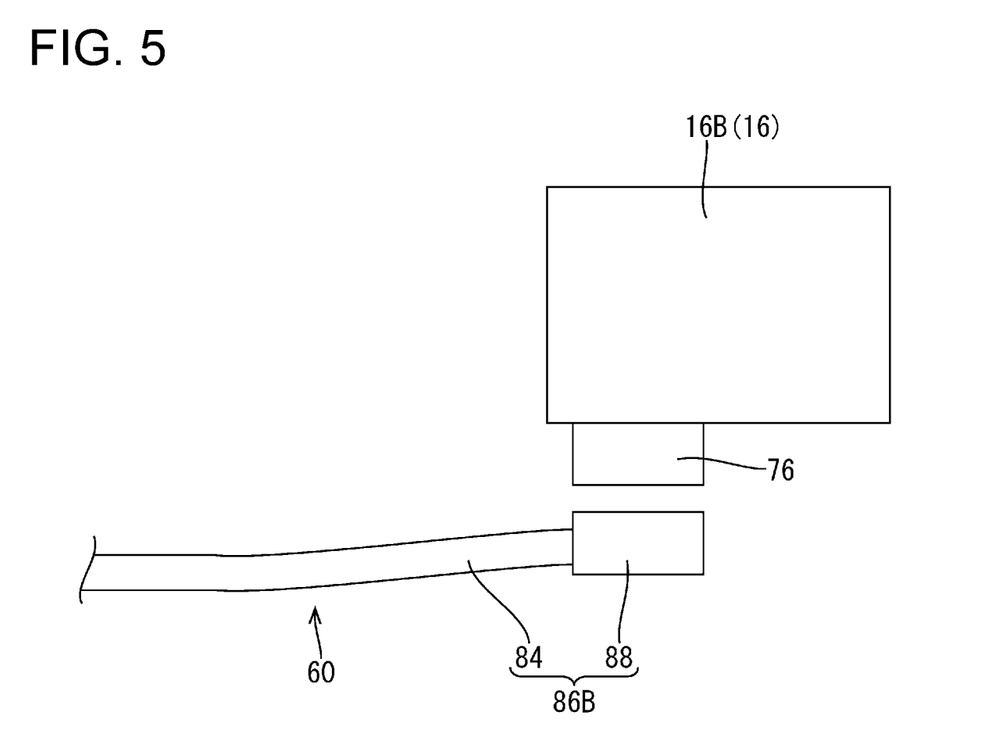
FIG. 5 is a diagram showing a connection structure of the first branch box and the second branch box achieved by a spring-connection connector.

As shown in FIG. 5, it is also possible to use a configuration in which the fourth connector 64 and the sixth connector 76 are electrically connected by a harness 86B that is constituted by a spring-connection connector 88 that connects to a partner-side terminal (not shown) through a spring contact (not shown) and an electrical wire group 84 that protrudes laterally in the horizontal direction from the spring-connection connector 88. Note that in FIG. 5, the fourth connector 64 and the harness-side connector that is connected to the fourth connector 64 are not shown, but have a configuration similar to that on the sixth connector 76 side.

As shown in FIG. 2, a compressor (one example of auxiliary equipment 20) 90 of an air conditioner, and an auxiliary equipment DC/DC converter (one example of auxiliary equipment 20) 92 are connected to two of the six seventh connectors 78. Here, the auxiliary equipment DC/DC converter 92 is a converter that converts the input DC voltage V2 (350 V) into a 12-V DC voltage and outputs the result, and the auxiliary equipment DC/DC converter 92 is connected to 12-V auxiliary equipment that operates with a 12-V voltage on the output side of the auxiliary equipment DC/DC converter 92, although this is not shown in the drawings. Examples of the auxiliary equipment 20 that is connected to another seventh connector 78 include an air conditioner, a water heater, a non-contact charger, an AC 100-V outlet, and a solar charger.

During operation of the travel system 22 and the auxiliary equipment 20 of the vehicle 12, the first SMR 46A and the second SMR 46B are switched on. Accordingly, the DC voltage V2 of the battery cell group 36 is applied to the first branch circuit 18A via the first connector 40 of the battery box 14 and the third connector 62 of the second branch box 16B, and is further applied to the second branch circuit 18B via the coupling circuit 60.

The DC voltage V2 applied to the first branch circuit 18A supplies electrical power to the travel system 22 via the fifth connector 66B and the fifth connector 66C. At this time, the DC voltage V2 is input to the FR-side boost converter 34A and the RR-side boost converter 34B of the PCU 32, and is boosted to the DC voltage V1. Furthermore, the boosted DC voltage V1 is input to the FR-side inverter 37A and the RR-side inverter 37B. The DC voltage V2 applied to the second branch circuit 18B is input to the auxiliary equipment 20 via the seventh connectors 78 and electrical power is supplied to the auxiliary equipment 20.

As described above, according to the present embodiment, the branch box 16 is divided into two branch boxes, namely the first branch box 16A and the second branch box 16B, the fifth connector (first connection portion) that is connected to the travel system 22 is provided in the first branch box 16A, and the seventh connectors (second connection portions) 78 that are connected to the auxiliary equipment 20 are provided in the second branch box 16B, whereby the first branch box 16A can be categorized in a travel system, and the second branch box 16B can be categorized in an equipment system. Here, in general, the higher the voltage input to the branch box 16 is, the greater the size of the bus bar and the connection portion will be, and accordingly, the greater the shape of the branch box 16 also will be. At this time, due to the fact that the voltage that is used in the travel system 22 tends to be higher (e.g., about 1000 V maximum) for a high-grade car (high-end car), and tends to be lower (e.g., about 500 V maximum) for a low-grade car (general car), the size of the first branch box 16A is greater in a high-end car. On the other hand, the voltage used in the equipment system is the same voltage (e.g., about 500 V maximum) in both a high-end car and a general car, and the size of the second branch box 16B is the same in both a high-end car and a general car. Accordingly, the second branch box 16B can be used in common in different vehicle grades (high-end cars and general cars) and the number of parts can be reduced.

Also, since the branch circuit 18 is provided in the branch box 16 that is provided outside of the battery box 14, in comparison to a configuration in which the branch circuit is provided inside of the battery box as in the conventional technique, the number of connection portions for connecting the battery box 14 and the functional parts mounted outside of the battery box 14 (e.g., the auxiliary equipment 20, the travel system 22, etc.) can be reduced, and the battery box 14 can be made smaller. Also, due to providing the coupling circuit 60 that couples the first branch circuit 18A and the second branch circuit 18B, there is no need for the connection portion for connecting from the battery box 14 to the second branch box 16B, and it is possible to further reduce the number of connection portions that connect the battery box 14 and the external functional parts (e.g., the auxiliary equipment 20, the travel system 22, etc.). Also, when an electronic part such as a fuse 72 in the branch box breaks down, it is possible to take only the branch box 16 out of the vehicle 12 and perform a task for exchanging the electronic part. Accordingly, the maintainability can be improved due to the fact that there is no need to remove the battery box 14 from the vehicle 12 in order to exchange the electronic part such as the fuse 72 as in the conventional technique.

Second Embodiment

Figure 6:
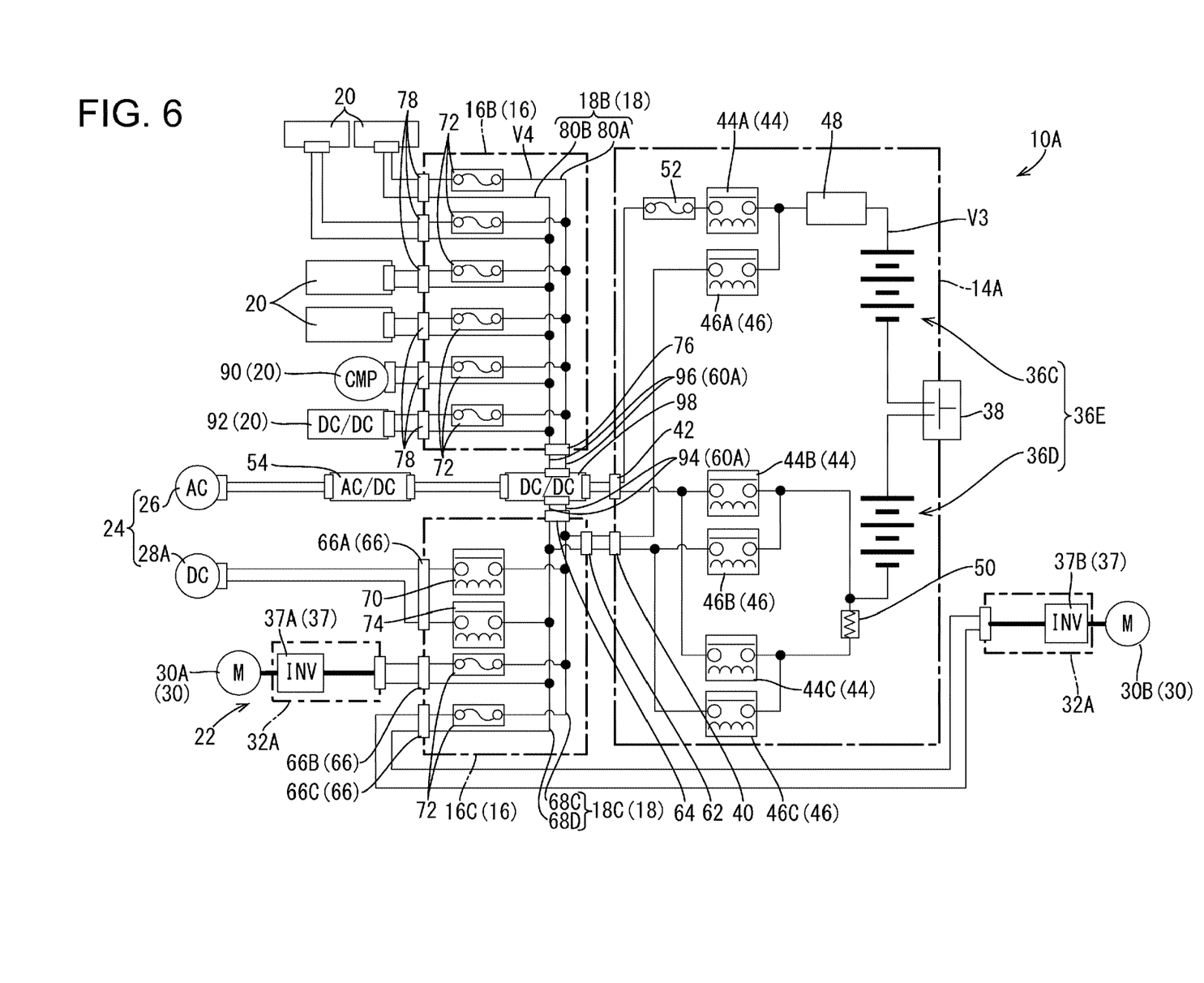
FIG. 6 is a block diagram showing an electrical configuration of a power source system according to a second embodiment.

The present embodiment will be described with reference to FIG. 6.

The power source system 10A of the present embodiment is a system that is to be used in a so-called high-end car, and a battery box 14A with a higher voltage than the battery box 14 of the first embodiment is used. Also, a coupling circuit 60A of the present embodiment is constituted by a first coupling circuit 94 that is electrically connected to a first branch circuit 18C and a second coupling circuit 96 that is electrically connected to a second branch circuit 18B, and furthermore, a DC/DC converter (transformation apparatus) 98 is provided between the first coupling circuit 94 and the second coupling circuit 96.

A battery cell group 36E composed of the first battery cell group 36C and the second battery cell group 36D has a rated voltage of 800 V and a maximum voltage of 1000 V. In the present embodiment, a DC voltage (first voltage) V3 output from the battery cell group 36E in the state in which a load is connected is a rated voltage of 800 V. Also, the boost converters 34 of the first embodiment are not provided in the PCUs 32A of the present embodiment, and the DC voltage V3 is directly input to the FR-side inverter 37A and the RR-side inverter 37B. Accordingly, due to the fact that the PCUs 32A of the present embodiment are not provided with the boost converters 34, it is possible to achieve a greater reduction in size than in the PCUs 32 of the first embodiment. Electrical power of 1000 V and 400 A (350 kW) is supplied from the DC power supply unit 28A.

The DC/DC converter 98 converts the DC voltage V3 of 800 V input from the first branch circuit 18C side into a DC voltage (second voltage) V4 of 350 V and outputs the result to the second branch circuit 18B. Due to the fact that the DC voltage V3 (800 V) for the first branch circuit 18C is higher than the DC voltage V2 (350 V) for the first branch circuit 18A in the first embodiment, the positive-side first bus bar 68C and the negative-side first bus bar 68D of the first branch circuit 18C is constituted by a thicker plate material than the positive-side first bus bar 68A and the negative-side first bus bar 68B in the first embodiment. Accordingly, the first branch box 16C has a larger build than the first branch box 16A of the first embodiment. On the other hand, due to the fact that the DC voltage V4 (350 V), which has the same potential as the DC voltage V2 (350 V) of the first embodiment, is applied to the second branch circuit 18B of the second branch box 16B by the DC/DC converter 98, the same branch box as in the first embodiment can be used as the second branch box 16B. Accordingly, since the second branch box 16B of the equipment system can be used in common for different vehicle grades (high-end cars and general cars), it is possible to reduce the number of parts.

The DC/DC converter 98 is connected to the first branch box 16C and the second branch box 16B using the same method as that illustrated in FIGS. 3 to 5 of the first embodiment. Since other respects are the same as in the first embodiment, they are denoted by the same reference numerals as in the first embodiment, as description thereof is omitted.

As described above, according to the present embodiment, since the voltage (first voltage) V3 in the first connector (third connection portion) 40 of the battery box 14 has the same potential as the operation voltage of the inverter 37, there is no need for the boost converter 34 that converts the input voltage into the operation voltage of the inverter 37 in the PCU (power control unit) 32, and the PCU (power control unit) 32 can be reduced in size.

Other Embodiments

The technique disclosed by the present specification is not limited to the embodiments described by means of the description above and the drawings, and for example, the following various aspects are also encompassed therein.

(1) In the first embodiment, the first branch box 16A of the travel system is 500 V maximum and the second branch box 16B of the equipment system is 500 V maximum, and in the second embodiment, the first branch box 16A of the travel system is 1000 V maximum and the second branch box 16B of the equipment system is 500 V maximum. However, the voltages of the first branch box 16A and the second branch box 16B may also be higher or lower than the voltages of embodiments above.

(2) In the first embodiment, the battery box 14 and the branch box 16 were electrically connected to each other by connecting the first connector 40 of the battery box 14 and the third connector 62 of the first branch box 16A. However, it is also possible to use a configuration in which the battery box 14 and the second branch box 16B are electrically connected to each other.

(3) In the above-described embodiments, the vehicle 12 had a configuration including the power supply unit 24, but for example, the power source systems 10 and 10A may also be applied to a hybrid car that does not include the power supply unit 24.

(4) In the above-described embodiment, the branch box 16 was provided outside of the battery boxes 14 and 14A, but it is also possible to use a configuration in which the function of the branch box 16 is provided inside of the battery boxes 14 and 14A.

The invention claimed is:

1. A vehicle comprising:
a battery box inside of which a plurality of battery cells are provided,
auxiliary equipment that can operate using electrical power,
a travel system that can travel using electrical power, and
a branch box that electrically connects the battery cells and the auxiliary equipment, and that electrically connects the battery cells and the travel system, wherein:
the branch box includes a first branch box and a second branch box,
the first branch box includes:
a first connection that is electrically connected to the travel system and can receive input of electrical power from the travel system or output electrical power to the travel system, and
a first branch circuit that electrically connects the battery cells and the first connection,
the second branch box includes
a second connection that is electrically connected to the auxiliary equipment and can receive input of electrical power from the auxiliary equipment or output electrical power to the auxiliary equipment, and
a second branch circuit that electrically connects the battery cells and the second connection,
the battery box includes a third connection that is electrically connected to the plurality of battery cells and can receive input of electrical power for charging the plurality of battery cells and output electrical power from the plurality of battery cells,
the first branch box includes a fourth connection that is electrically connected to the third connection and the first branch circuit,
a coupling circuit that electrically connects the first branch circuit and the second branch circuit is provided between the first branch circuit and the second branch circuit,
the vehicle is configured to be a first vehicle or a second vehicle configured to operate with a higher voltage than the first vehicle,
when the first vehicle is to be operated,
the battery box is a first battery box, the first branch box is a first low-voltage branch box, and a voltage of the third connection in the first battery box is a voltage V2, and
a voltage of the first branch circuit for the first low-voltage branch box and a voltage of the second branch circuit for the second branch box have a same potential as the voltage V2, and
when the second vehicle is to be operated,
the battery box is a second battery box, the first branch box is a first high-voltage branch box, and the voltage of the third connection of the second battery box is a voltage V3, which is a voltage that is higher than the voltage V2, and
the voltage of the first branch circuit for the first high-voltage branch box has a same potential as the voltage V3, the voltage of the second branch circuit for the second branch box is a voltage V4, which is a voltage obtained by transforming from the voltage V3, and the voltage V4 has a same potential as the voltage V2.

2. The vehicle according to claim 1, wherein
the travel system includes an electric motor for causing the vehicle to travel and a power control unit that includes an inverter for causing the electric motor to operate, a voltage by which the inverter can operate is the voltage V3, when the first vehicle is to be operated, the power control unit further includes a boost converter for boosting the voltage V2 to a voltage V1 that has a same potential as the voltage V3, and when the second vehicle is to be operated:
    the coupling circuit includes a first coupling circuit that is electrically connected to the first branch circuit and a second coupling circuit that is electrically connected to the second branch circuit, and
    the first coupling circuit and the second coupling circuit are electrically connected to each other via a transformation apparatus for transforming the voltage V3 to the voltage V4.

\* \* \* \* \*